UNITED STATES PATENT OFFICE.

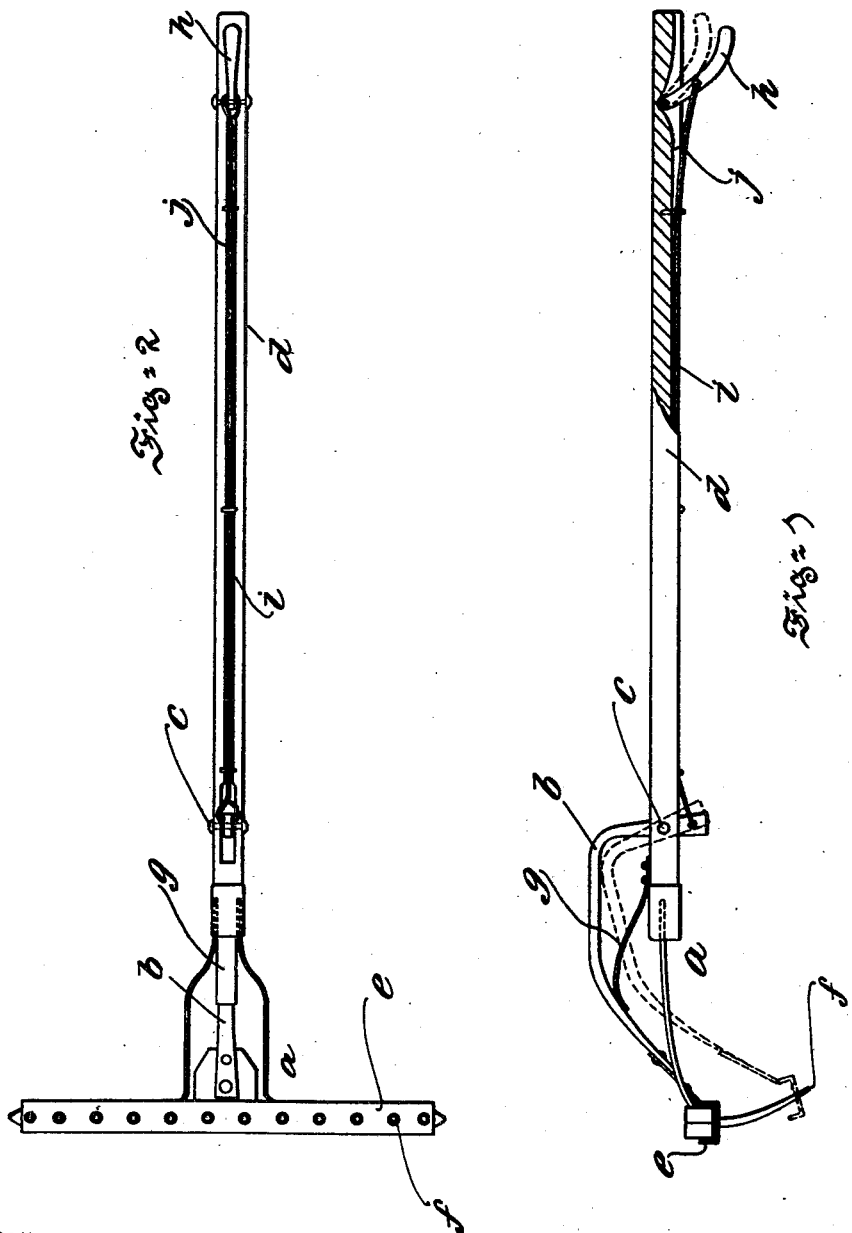

EDMUND C. MACARTNEY, OF PHILADELPHIA, PENNSYLVANIA, ASSIGNOR OF ONE-HALF TO HARMON B. AMERLING, OF PHILADELPHIA, PENNSYLVANIA.

SELF-CLEARING RAKE.

No. 819,017.     Specification of Letters Patent.     Patented April 24, 1906.

Application filed December 2, 1905. Serial No. 289,971.

*To all whom it may concern:*

Be it known that I, EDMUND C. MACARTNEY, a citizen of the United States, and a resident of Chestnut Hill, in the city of Philadelphia, county of Philadelphia, and State of Pennsylvania, have invented a certain new and useful Self-Clearing Rake, of which the following is a specification.

One object of the present invention is to provide a light, durable, practicable, and comparatively inexpensive self-clearing rake.

A further object is to provide a rake that can be readily cleared of refuse by slight pressure exerted upon parts of the rake in close proximity to the normal position of the hands of the operator.

To these and other ends hereinafter set forth the invention, stated in general terms, comprises the improvements to be presently described and finally claimed.

The nature, characteristic features, and scope of the invention will be more fully understood from the following description, taken in connection with the accompanying drawings, forming part hereof, and in which—

Figure 1 is a side elevational view of a rake embodying the invention, and Fig. 2 is view of the under side of the same.

In the drawings, the rake *a* is equipped with a member *b*, one end of which is pivotally secured, as at *c*, to the rake-handle *d* and the other or outer end of which is provided with a clearing-plate *e*. This clearing-plate is provided with openings through which pass the teeth *f* of the rake. Mounted upon the rake-handle *d* is a spring *g*, adapted to normally keep the member *b*, together with its clearing-plate *e*, in the position shown in Fig. 1. Pivotally secured at or near the outer end of the rake-handle is a pivotal lever *h*.

*i* is a suitable medium—in the present instance a rod—forming a connection between the member *b* and the lever *h*. The handle *d* may be grooved, as *j*, to accommodate the rod *i*.

To operate the device for clearing the rake-teeth of refuse, it is merely necessary to press upon the lever *h*, which through the instrumentality of the rod *i* causes the pivotal member *b*, together with its clearing-plate *e*, to overcome the spring *g* and assume the position shown in dotted lines in Fig. 1. By releasing the lever the spring causes the spring-plate to return to its normal position.

It will be obvious to those skilled in the art to which my invention relates that modifications may be made in details without departing from the spirit thereof. Hence the invention is not limited further than the prior state of the art may require; but,

Having thus described the nature and objects of the invention, what I claim as new, and desire to secure by Letters Patent, is—

1. The combination with a rake of a spring-controlled inverted generally U-shaped member comprising a single piece pivotally secured at one of its ends to the rake-handle, a clearing-plate mounted upon the opposite end of said member, a lever pivoted to the rake-handle, and a connection between the said lever and spring-controlled member, substantially as described.

2. The combination with a rake of a member comprising a single piece pivotally secured at its inner end to the rake-handle and carrying at its outer end a clearing-plate, a spring interposed between the top of the handle and said member, a lever pivoted to the rake-handle and a connection between the said lever and member the rake-handle being grooved as at *j*, for the said connection, substantially as described.

3. The combination with a rake-head and its slotted handle secured thereto of a movable plate having perforations for the passage of the rake-teeth, a member having one of its ends pivotally secured within the slotted portion and rising above the said rake-handle and bent downwardly for attachment to the movable plate, a spring arranged between the top of the handle and said member a hand-lever pivoted to the handle and a connection between the lever and the said member, substantially as described.

In testimony whereof I have hereunto signed my name.

EDMUND C. MACARTNEY.

Witnesses:
     WM. J. JACKSON,
     EVA E. EDGE.